3,480,300
PIPE COUPLING
Warren C. Jeffery and Sidney P. Teague, Birmingham, Ala., assignors to McWane Cast Iron Pipe Company, Birmingham, Ala., a corporation of Delaware
Filed Feb. 24, 1966, Ser. No. 529,823
Int. Cl. F16l 35/00, 55/00, 19/00
U.S. Cl. 285—93
10 Claims

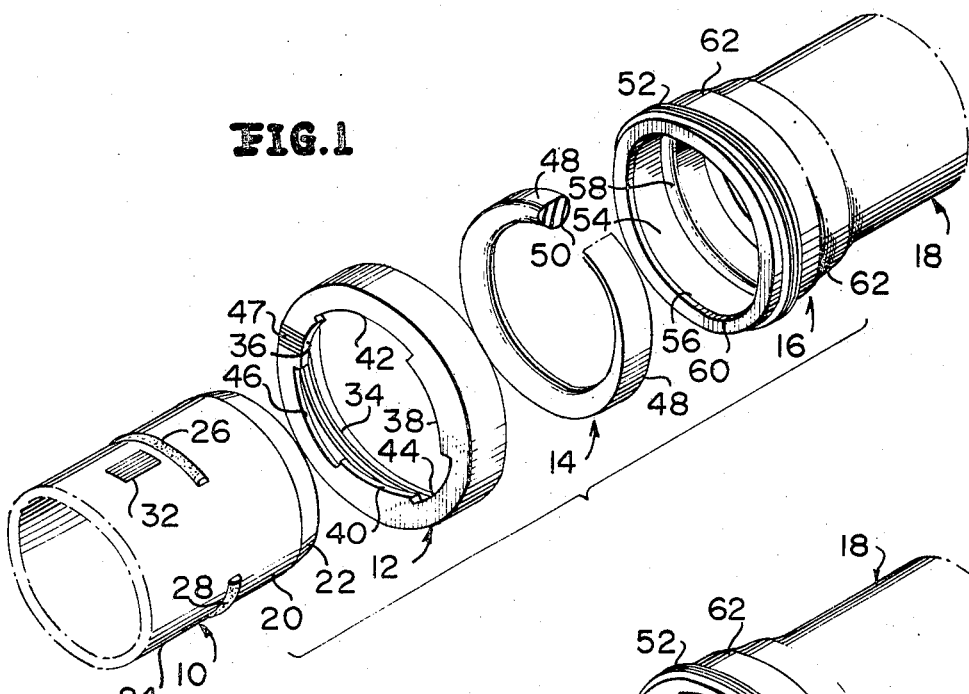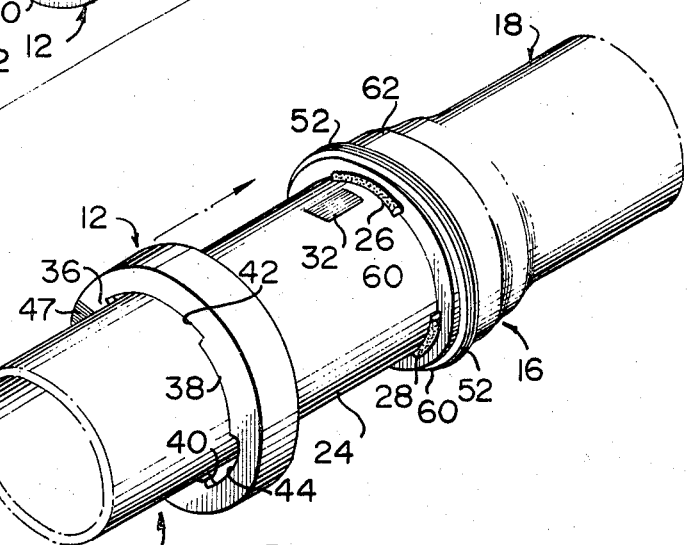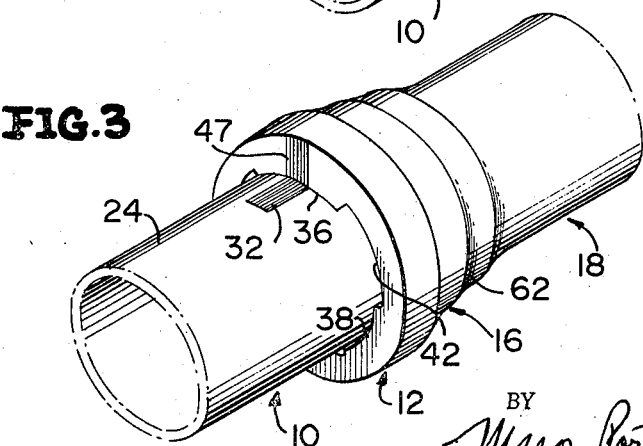

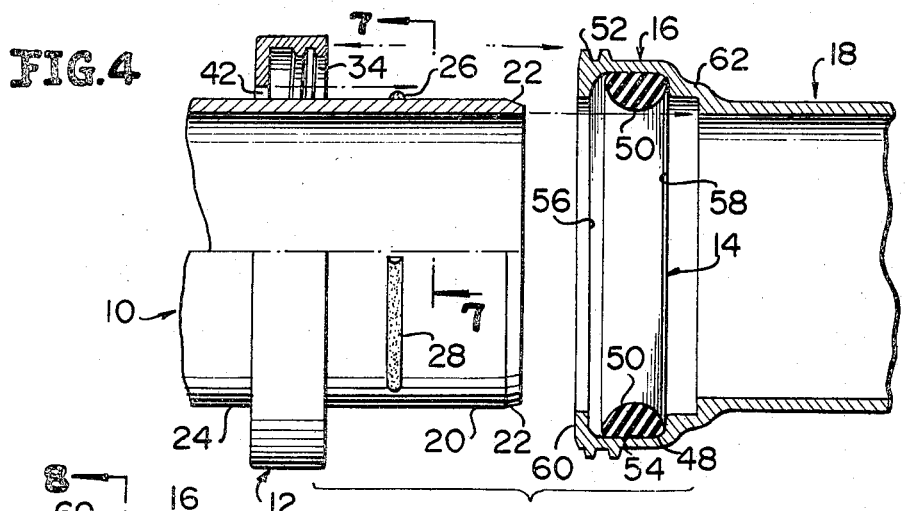
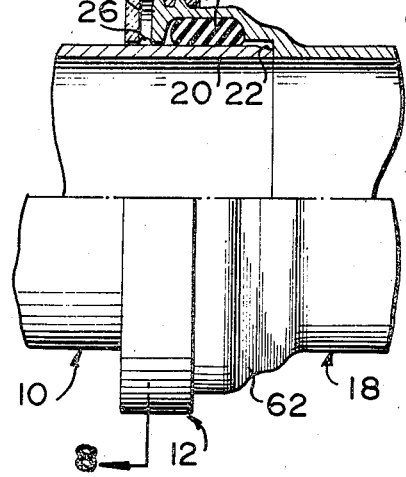
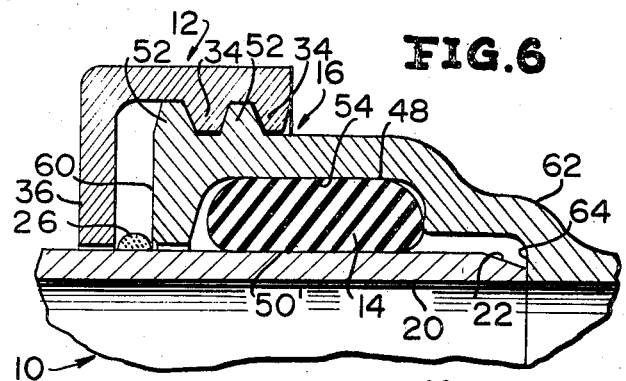
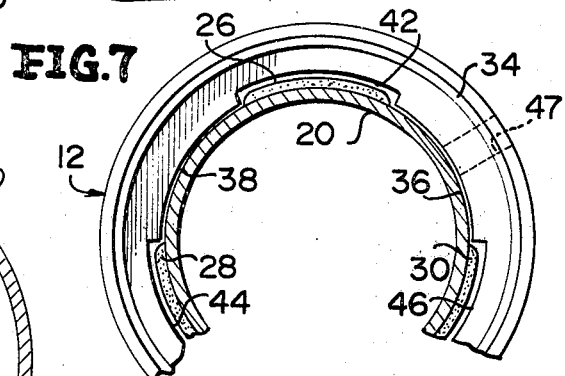
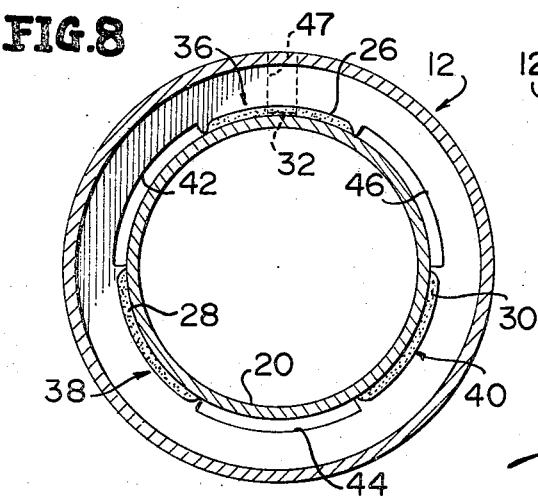
INVENTORS
WARREN C. JEFFERY
& SIDNEY P. TEAGUE United States Patent Office 3,480,300
Patented Nov. 25, 1969

ABSTRACT OF THE DISCLOSURE

This disclosure relates to a bell and spigot pipe joint wherein a collar surrounds the spigot and is adapted for axial sliding and rotational movement relative thereto, the collar and spigot each include a single discontinuous projection which when in axial alignment prevent the collar from sliding relative to the spigot but when in non-axial alignment the collar can be readily applied to the spigot, rotated and brought to the first-mentioned position at which coupling means maintain the bell, collar and spigot in assembled relationship.

Prior art

A multitude of attempts have been made and are known in the prior art for joining adjacent sections of pipes. Although many of the couplings achieved some degree of success, others failed dismally in that the pipe joints rapidly deteriorated, leaked when subjected to higher than usual pressures, were extremely difficult to assemble and required the employment of skilled or at least semi-skilled personnel, and were costly in the matter of economics to produce.

It is known that the problems associated with these conduits are greater and distinct from the problems associated with the joining of pipes of smaller diameters usually employed in residential and the like service. Heretofore, sections of pipe employing the bell and spigot principle, were joined by metal-to-metal seals wherein a collar maintained the adjacent bell and spigot in position and effected the seal, or a lead or other material ring was substituted for the collar and forced into place around the spigot and into the bell. Needless to say, joints and couplings of this type were difficult to assemble, maintain, and disassemble. Subsequently, it was discovered that juxtaposed valve and spigot members could be joined in such a manner that an O-ring sealing member could be employed to effect a seal between the spigot and the bell. The O-ring sealing members took many geometrical shapes from the simple circular cross-section to complicated geometric forms which included locking beads and projections and the like. In many instances, a collar or clamp of some configuration was necessary to maintain the seal. In other forms and embodiments, the joint could be maintained in position without additional securing means or a securing means may be employed but served primarily to maintain the bell and spigot in position without effecting the quality of the seal between the bell and spigot.

Prior pipe joints and couplings failed to provide a large area of contact with the intervening sealing members so that they did not provide a positive sealing area for low pressure applications such as gas, or for higher pressure applications, such as water. Further, known sealing members or gaskets did not provide stability during assembly of the bell and spigot members. That is to say, the sealing members tended to roll over and thus become misaligned during assembly procedures. The heretofore known couplings were difficult to assemble, did not permit any misalignment of adjacent pipe sections, and usually require the services of skilled or at least semi-skilled assemblers.

Accordingly, it becomes desirable to provide a pipe joint which is easily assembled by unskilled workmen, will permit the transmission of fluids under high or low pressure, is economical to manufacture, and which will withstand separation from internal pressures which produce a large end thrust. Further, it is desirable that all components, except for the sealing member, be of one engineering material so as to eliminate any tendency to accelerate corrosion by galvanic action.

Summary of the invention

In accordance with this invention a pipe joint is provided which includes a bell member having external threads formed thereon and an annular recess formed about the inner surface of the bell member. The recess is rectangular in cross-section so as to accommodate an elastomeric sealing member having, in cross-section, a flat peripheral section adapted to seat in the recess and an arcuate inner section for engaging a received spigot. The spigot bears a circumferential bead which may be either continuous or in segments and may be formed by welding the bead either immediately after manufacture or just prior to the step of assembling the pipe joint. A collar is positioned about the spigot and is formed with a radially inwardly directed flange for engaging the bead of the spigot and also is formed with internal threads for maintaining threaded engagement with the bell. The spigot, collar and bell may be of ductile cast iron. In addition, a first indicium is formed on the spigot and a second indicium is formed on the collar so that when both indicia are aligned, a section of the flange of the collar is directly behind a section or segment of the spigot bead. In the segmented bead configuration, the collar may be readily assembled over the spigot and the seal due to the complementary configuration of the collar flange and the spigot bead. In the preferred embodiment, three beads are formed on the spigot; however, it will be understood that the number of segments or sections of the bead may be increased or decreased according to the need or the desirability of doing so.

The invention both as to its organization and method of operation together with further objects and advantages thereof will best be understood by reference to the following specification taken in conjunction with the accompanying drawings in which:

FIGURE 1 is an exploded perspective view illustrating a spigot, a collar, an elastomeric sealing ring, and a spigot having a bell integrally formed thereto, in that order;

FIGURE 2 is a perspective view showing a preliminary step in the assembly of the pipe joint;

FIGURE 3 is a perspective view illustrating the final assembly of the pipe joint;

FIGURE 4 is an elevational view of the two pipes prior to joining with parts broken away and shown in section;

FIGURE 5 is an elevational view of the two pipes in their assembled positions with parts broken away and shown in section;

FIGURE 6 is an enlarged fragmentary view of a portion of the FIGURE 5 and illustrating the seal between the bell and spigot and the collar engaging the bead of the spigot and the threads of the bell:

FIGURE 7 is a partial vertical sectional view taken along the line 7—7 of the FIGURE 4 and setting forth the alignment of the circumferential spigot beads and the recesses of the collar which permits the assembly of the collar over the end of the spigot and past the circumferential beads; and FIGURE 8 is a sectional view taken along the line 8—8 of the FIGURE 5 and clearly illustrating the position of the flange of the collar in its locking position behind the circumferential beads of the spigot.

With reference to the FIGURE 1, the exploded perspective view of that figure illustrates a spigot 10, a collar 12, an elostomeric annular sealing member 14, and a bell 16 integrally joined to a spigot 18. The spigot 10 includes a leading section 20 having a tapered outer surface 22 and a trailing section 24, the leading section 20 and the trailing section 24 of the spigot 10 being generally defined by a circumferential bead having the bead segments 26, 28, and 30, only the bead segments 26 and 28 being visible in the FIGURE 1. Although the circumferential bead is shown as segmented, it will be readily understood that the circumferential bead could be continuous about the periphery of the spigot 10, the requirement being that the collar 12 would be positioned over the trailing section 24 prior to the formation of the circumferential bead since the leftmost portion of the spigot 10 would normally be integrally formed with a bell, such as the bell 16. The circumferential bead whether continuous or composed of the bead segments 26, 28 and 30 could be formed by welding or, alternatively, could be cast integrally with the spigot 10. In the event that the circumferential bead is to be continuous, it could not normally be cast integrally with the spigot 10 since the collar 12 would have to be concentric with the spigot 10 during molding procedures. The spigot 10 includes an indicium 32 formed on the trailing section 24 which may be in the form of serrations, paint, a film of tape, etc.

The collar 12 is internally threaded as indicated at 34 and formed with a plurality of radially and inwardly directed flanges 36, 38 and 40 separated by an equal number of recesses 42, 44 and 46. An indicium 47 is formed on the front edge surface of the collar 12 adjacent the flange 36. When the indicium 47 of the collar 12 is aligned with the indicium 32 of the spigot 10, the collar 12 is in the proper position for locking the spigot 10 to the bell 16, i.e., the flanges 36, 38 and 40 are engaging the bead segments 26, 28 and 30. Only the bead segments 26 and 28 are visible in the FIGURE 1, reference being had to the FIGURES 7 and 8 for the position of the bead segment 30.

With continued reference to the FIGURE 1, the elastomeric sealing member 14 is generally annular in elevational view and is formed with a flat periphery 48 and an arcuate inner section 50 which joins the outer edges of the flat periphery 48 in a geometrical configuration generally in the form of an ellipse or in a special form of ellipse, such as a circle. The sealing member 14 may be of rubber or of other elastic type compositions.

The bell 16 is externally threaded as indicated at 52 and formed with an inner annular recess 54 having a front end wall 56 and a rear end wall 58. The bell 16 has a flat front surface 60 and is integrally joined to the spigot 18 by an arcuate section 62.

A step in the assembly of the components of the FIGURE 1 is illustrated in the perspective view of the FIGURE 2. More specifically, the annular sealing member 14 has been positioned within the recess 54 of the bell 16 and the leading section 20 of the spigot 10 has been inserted into the bell 16 up to the point where the bead segments 26, 28 and 30 engage the flat front surface 60 of the bell 16. Prior to the step of inserting, the collar 12 is positioned about the spigot 10 so that the recesses 42, 44 and 46 pass over the bead segments 26, 28 and 30 and the flanges 36, 38 and 40 pass in the areas between the bead segments. The position of the collar 12 after this step is shown in the FIGURE 2.

Next, the final assembly of the pipe joint is shown in the FIGURE 3. Here the collar 12 has been advanced toward the bell 16 and the collar 12 rotated so that the internal threads 34 (shown in the FIGURE 1) engage the external threads 52 of the bell 16. The collar 12 is rotated until the flanges 36, 38 and 40 commence to engage the bead segments 26, 28 and 30 and the indicium 32 on the trailing section 24 of the spigot 10 aligns with the indicium 47 on the collar 12. When alignment of the indicia 32 and 47 is accomplished, the flanges 36, 38 and 40 are locked behind the bead segments 26, 28 and 30, their positions being more clearly illustrated in subsequent figures.

The FIG. 4 is an elevational view of the two pipes prior to joining with parts broken away and shown in section. The elastomeric sealing member 14 has been positioned in the recess 54 of the bell 16 and the collar 12 has been advanced over the leading section 20 of the spigot 10 and past the bead segments 26, 28 and 30. In the next step of the assembly, the leading section 20 of the spigot 10 is inserted into the sealing member 14, the tapered surface 22 cooperating with the arcuate inner section 50 of the sealing member 16 so as to permit the entry of the leading section 20 of the spigot 10 into the bell 16.

After the pre-assembly of the pipe joint wherein the leading section 20 of the spigot 10 is inserted into the bell 16 and in sealing engagement with the arcuate inner section 50 of the elastomeric sealing member 14, the collar 12 is positioned as shown in the FIGURES 5 and 6. With the leading section 20 of the spigot 10 inserted into the bell 16 as shown, the end of the tapered surface 22 abuts a rear end wall 64 within the arcuate section 62 and the bead segments, only the bead segment 26 being visible in the FIGURES 5 and 6, abuts the flat front surface 60 of the bell 16. The arcuate inner section 50 of the sealing member 14 has been deformed and is shown as 50' wherein a large area of the sealing member 14 engages the periphery of the leading section 20 so as to effect a seal between the spigot 10 and the bell 16. With the threads 34 of the collar 12 engaging the threads 32 of the bell 16, as shown, the flanges 36, 38 and 40 (only the flange 36 being visible in the FIGURES 5 and 6) engage the bead segments 26, 28 and 30 and thereby urge and retain the spigot 10 in the position shown. The collar 12 and its cooperating elements does little, if anything, toward the sealing feature of the pipe joint, the function of the collar 12 and its cooperating elements being to retain the spigot 10 in position with respect to the bell 16.

The FIGURE 7 is a vertical sectional view taken along the line 7—7 of the FIGURE 2 and illustrates the position of the collar 12 with respect to the bead segments 26, 28 and 30 so as to accomplish the assembly of the collar 12 over the spigot 10. Specifically, the bead segment 26 is shown aligned with the recess 42; the bead segment 28 is shown aligned with the recess 44; and, the bead segment 30 is shown aligned with the recess 46. From this view, it is intuitively clear that the collar 12 can be readily assembled over the spigot 10 from the leading section 20 past the bead segment to the trailing section 24. The indicium 47 on the collar 12 is shown in the FIGURE 7 in dotted outline.

With reference to the FIGURE 8, which is a vertical sectional view taken along the line 8—8 of the FIGURE 5, the bead segments are shown in their position behind their corresponding flange. For example, the flange 36 is behind the bead segment 26 (as also viewed in the FIGURE 6); the flange 36 is behind the bead segment 28; and, the flange 40 is behind the bead segment 30. The indicium 32 shown in dotted outline and the indicium 47 also shown in dotted outline are aligned since the collar 12 is in locking position.

Thus, there has been illustrated and described a pipe joint which includes a screw-on cap or collar which serves to retain a spigot and bell in position. A seal is effected between the spigot and bell due to an elastomeric annular sealing member which resides within a recess formed in the bell. The received spigot includes a plurality of circumferential bead segments which permit the positioning of the collar over the spigot prior to assembly of the spigot into the bell. Upon final assembly, a plurality of flanges which are formed radially and inwardly on the collar engage the bead segments so as to effect a positioning of the spigot with respect to the bell. The spigot, bell and collar may be of ductile cast iron and of a type set forth in the Mills et al. Patent No. 2,485,760. In addition, ductile cast iron is referred to in an article entitled "The Welding of Ductile Iron" which appeared in Supplement to the Welding Journal, of January 1960. In the article referred to, it is stated that substantial improvements in the properties of cast iron are made possible by the addition of a few hundredths of a percent of either magnesium or cerium.

A great number of advantages accrue with the use and practice of the present invention. The flat area on top of the sealing member and inside the bell of the pipe make it possible to accurately gage the items to be assembled. The flattened sealing member after assembly of the pipe joint provides a large area of contact which gives greater and more positive sealing power for low pressure application such as gas. In addition, the sealing member is fabricated from rubber having one durometer hardness which results in a cost savings. Furthermore, the flat surface on top of the sealing member provides stability of the sealing member during assembly. That is to say, the sealing member does not tend to roll over during assembly and can be assembled in the field by unskilled personnel.

From the construction provided, it is evident that the screw-on collar shrouds both the weld and the sealing member and in fact the entire joint, from deterioration by surrounding soil and service environment. The joint set forth and illustrated will withstand separation from internal pressures which provide a large end thrust. In other words, the joint is a positive lock which is essential for high pressure water service and for low pressure gas service. The improved elastomeric sealing member is considerably easier to manufacture and assemble than other sealing members known in the art. In addition, all components of the pipe joint except for the sealing member are made of one engineering material, ductile cast iron, which eliminates any tendency to accelerate corrosion by galvanic action.

Thus, the present invention may be embodying other specific forms without departing from the spirit and the essential characteristics of the invention. The present embodiment is, therefore, to be considered in all respects as illustrative.

What is claimed is:

1. A pipe joint comprising a spigot having an end portion telescopically received in a bell, sealing means between the spigot and the bell, a collar surrounding the spigot and being adapted for axial sliding and rotational movement relative thereto, cooperative means between the collar and the spigot for preventing axial movement between the collar and the spigot in a first position and for permitting axial movement between the collar and the spigot in a second position, and said collar includes integral means for securing said collar directly to said bell in said first position.

2. The pipe joint as defined in claim 1 including first indicia means on said spigot and second indicia means on said collar for indicating said first and second positions.

3. The pipe joint as defined in claim 1 wherein said cooperative means is defined by at least a single discontinuous radially inwardly directed projection of said collar and a single discontinuous radially outwardly directed projection of said spigot, said projections being in generally axially aligned relationship in said first position and in non-axially aligned relationship in said second position.

4. A pipe joint comprising a spigot having an end portion telescopically received in a bell, sealing means between the spigot and the bell, a collar surrounding the spigot and being adapted for axial sliding and rotational movement relative thereto, cooperative means between the collar and the spigot for preventing axial movement between the collar and the spigot in a first position and for permitting axial movement between the collar and the spigot in a second position, means securing said collar to said bell in said first position, said cooperative means being defined by at least a single discontinuous radially inwardly directed projection of said collar and a single discontinuous radially outwardly directed projection of said spigot, said projections being in generally axially aligned relationship in said first position and in non-axially aligned relationship in said second position, and said outwardly directed projection of said spigot is a weld bead.

5. The pipe joint as defined in claim 1 wherein said cooperating means is defined by a plurality of circumferentially spaced radially inwardly directed projections of said collar and a plurality of circumferentially spaced radially outwardly directed projections of said spigot, said projections being in generally axially aligned relationship in said first position and in non-axially aligned relationship in said second position.

6. The pipe joint as defined in claim 5 including first indicia means on said spigot and second indicia means on said collar for indicating at least one of said first and second positions.

7. The pipe joint as defined in claim 5 wherein said integral securing means is a threaded connection between said collar and said bell.

8. The pipe joint as defined in claim 5 wherein the space defined between adjacent pairs of said radially inwardly directed projections is sufficiently large to freely receive and pass through an associated one of said radially outwardly directed projections.

9. The pipe joint as defined in claim 1 wherein said cooperative means is defined at least in part by a radially outwardly directed projection rigidly fixedly secured to said spigot.

10. The pipe joint as defined in claim 3 wherein said radially outwardly directed projection is rigidly fixedly permanently secured to said spigot.

References Cited

UNITED STATES PATENTS

| | | | |
|---|---|---|---|
| 841,881 | 1/1907 | Montie | 285—342 |
| 1,273,174 | 7/1918 | Noakes | 285—93 |
| 1,939,936 | 12/1933 | Walker et al. | 285—412 |
| 2,684,860 | 7/1954 | Rafferty | 285—376 |
| 3,273,919 | 9/1966 | Billeter et al. | 285—374 |
| 1,535,294 | 4/1925 | Collins | 285—401 |
| 1,853,411 | 4/1932 | Gentry et al. | 285—391 X |
| 3,345,084 | 10/1967 | Hanes et al. | 285—391 X |

DAVID J. WILLIAMOWSKY, Primary Examiner

W. L. SHEDD, Assistant Examiner

U.S. Cl. X.R.

285—354, 376, 401